United States Patent [19]

Harrison

[11] Patent Number: 4,928,785
[45] Date of Patent: * May 29, 1990

[54] FULL FLOW SOLENOID VALVE FOR AIR GUN OPERATION

[75] Inventor: Earnest R. Harrison, Plano, Tex.

[73] Assignee: Halliburton Geophysical Services, Inc., Houston, Tex.

[*] Notice: The portion of the term of this patent subsequent to May 2, 2006 has been disclaimed.

[21] Appl. No.: 289,949

[22] Filed: Dec. 22, 1988

Related U.S. Application Data

[63] Continuation of Ser. No. 87,003, Aug. 18, 1987, Pat. No. 4,825,973.

[51] Int. Cl.$^5$ .............................................. H04R 1/02
[52] U.S. Cl. .................................. 181/120; 251/129.01
[58] Field of Search ............... 181/115, 117, 118, 120; 367/144, 146; 124/56, 71, 72, 73, 75, 76, 77; 251/129.01, 129.02, 129.15, 129.22

[56] References Cited

U.S. PATENT DOCUMENTS

| | | | |
|---|---|---|---|
| 3,929,315 | 12/1975 | Rieth | 251/129.01 |
| 4,291,860 | 9/1981 | Bauer | 251/129.02 |
| 4,825,973 | 5/1989 | Harrison | 181/120 |

Primary Examiner—Brian S. Steinberger
Attorney, Agent, or Firm—Thomas R. Weaver; E. Harrison Gilbert, III

[57] ABSTRACT

The disclosure relates to a solenoid valve for an air gun which substantially increases the rate at which maximum air flow is achieved. The new valve structure includes a coil actuated plunger, which is preferably solid and formed of a magnetically permeable material and closes an annular 360 degree port opening between the valve inlet and valve outlet when in the unactuated state. This plunger position is maintained by a biasing spring which forces the forward annular sharp plunger edge against a face seal in the nose of the valve, thereby sealing the valve input port from its output port. Upon actuation of the solenoid valve coil, the plunger is moved against the bias of the spring very rapidly, thereby speedily uncovering the channel between inlet and outlet and permitting rapid 360 degree communication between the inlet and outlet to permit maximum air flow therebetween and out of the outlet port. Air flow is past the edge of the plunger and along an unimpeded 360 degree path rather than through a hollow stem. The importance of this is that the pressure provided by the solenoid valve builds up much faster and results in a much improved timing of the air gun firing (reduction in firing jitter).

4 Claims, 2 Drawing Sheets

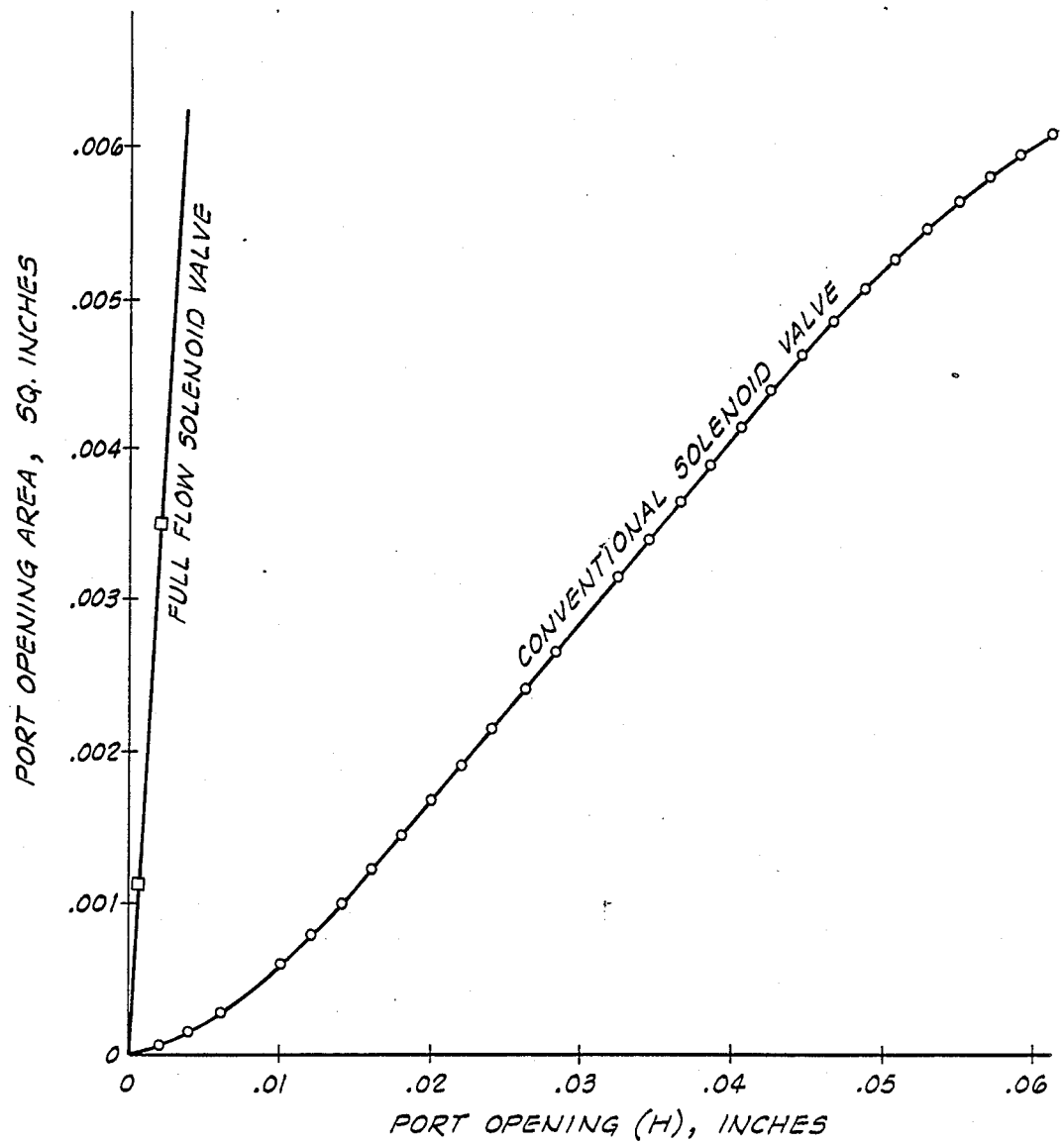
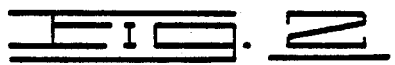

FULL FLOW SOLENOID VALVE FOR AIR GUN OPERATION

This application is a continuation of application Ser. No. 07/087,003, filed Aug. 18, 1987, now U.S. Pat. No. 4,825,973.

BACKGROUND OF THE INVENTION

1. Field of the Invention

This invention relates to a solenoid valve and, more specifically, to a solenoid valve for use in conjunction with an air gun which is utilized in seismic exploration.

2. Brief Description of the Prior Art

Air guns are well known in the field of seismic exploration, such air guns being used to provide a seismic wave which penetrates the earth's crust and is reflected from the various strata therein. These reflected waves are analyzed to provide information as to the content and location of the subterranean strata from which the reflection takes place.

In the operation of an air gun of the above noted type, as exemplified by the patent of Chelminski (4,240,518), the solenoid valve acts to trip a shuttle valve which, in turn, fires the gun. The rate of discharge of the high pressure solenoid valve air determines the speed of shuttle release. Therefore, it is extremely important that the solenoid valve discharge air flow rate be maximized. The importance of a fast discharge rate is evidenced from the graph of FIG. 1 which is a comparison of the pressure supplied by a valve which provides full area flow rapidly (full flow) as opposed to a prior art valve which gradually increases the flow rate until full flow is achieved. It can be seen that the time window (delta t1) during which the pressure is in the gun triggering pressure range is much shorter for a system wherein full flow is rapidly achieved as compared to the time window (delta t2) of the conventional valve wherein full flow is achieved slowly. This means that the more rapidly a valve can achieve full flow, the smaller will be the triggering pressure range window, thereby increasing the accuracy of determining the actual triggering time and improving the likelihood of repeatability. It is therefore apparent that the rise time of the solenoid valve pressure is very important in reducing the firing time variation (t) of the air gun. The slower the pressure rise time, the greater the air gun firing time variation.

A reason for the relatively slow pressure rise time in conventional air gun solenoid valves is that the plunger slides on a center stem and gradually uncovers small drilled port holes in the stem as it travels. Uncovering of these holes provides a flow path for the discharging air, thereby gradually increasing the air flow rate from valve inlet to valve outlet. Due to the location of the stem seal, the plunger must travel a short distance before the ports begin to open, thus delaying the firing of the air gun. As the ports are continually opened, the flow area increases until it equals the flow area of the central hole of the stem. At that time, the flow area becomes the constant flow area of the stem holes.

It is readily apparent from the above discussion that improved accuracy in timing of gun firing can be achieved by providing an air gun capable of rapidly achieving the maximum air flow rate capability of the solenoid valve.

SUMMARY OF THE INVENTION

In accordance with the present invention, there is provided a solenoid valve which substantially increases the rate at which maximum air flow is achieved, thereby providing the advantages flowing therefrom as enumerated above.

Briefly, in accordance with the present invention, the prior art hollow stem with port holes drilled therein and hollow plunger which uncovers these port holes are replaced by a new structure wherein flow rate increases linearly with plunger displacement. The new valve structure includes a coil actuated plunger, which has no port holes therein, is formed of a magnetically permeable material and closes an annular 360 degree port opening between the valve inlet and valve outlet when in the unactuated state. This stem position is maintained by a biasing spring which forces the forward annular sharp edge thereof against a face seal in the nose of the valve, thereby sealing the valve input port from its output port. Upon actuation of the solenoid valve coil, the plunger is moved against the bias of the spring very rapidly, thereby speedily opening the channel between inlet and outlet and permitting rapid 360 degree communiction between the inlet and outlet to permit maximum air flow therebetween and out of the outlet port. Air flow is past the edge of the plunger and along an unimpeded path rather than through a hollow stem. The importance of this is that the pressure provided by the solenoid valve builds up much faster and results in a much improved timing of the air gun firing (reduction in firing jitter).

BRIEF DESCRIPTION OF THE DRAWINGS

FIG. 2 is a plot of the flow area v. plunger displacement for the conventional solenoid valve and the valve of the subject invention.

DESCRIPTION OF THE PREFERRED EMBODIMENT

Figure 3:
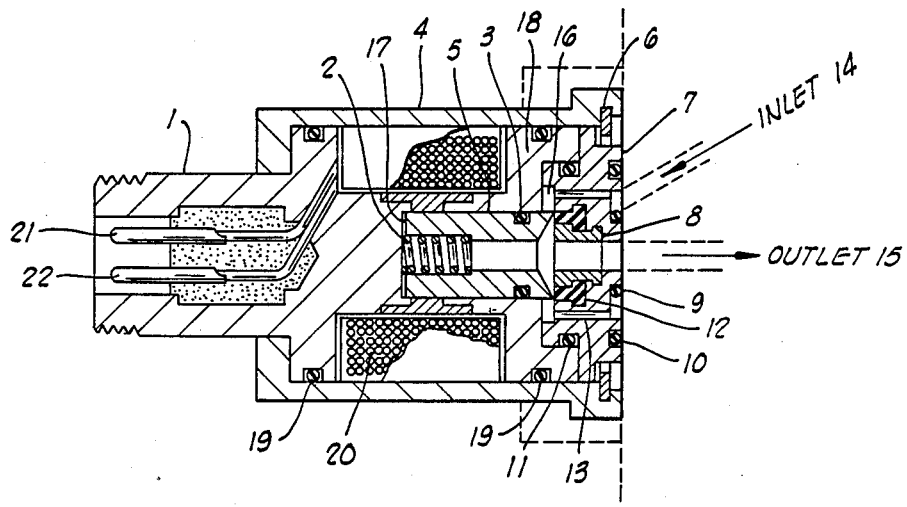
FIG. 3 is a cross-sectional view of a solenoid valve in accordance with the present invention.

Referring now to FIG. 3, there is shown a cross sectional view of a solenoid valve in accordance with the present invention. The valve includes a magnetically permeable housing 4, preferably formed of stainless steel, which is secured over a pole piece 1 of magnetically permeable material, preferably stainless steel. The pole piece 1 includes a pair of grooves therein for receiving O-rings 19 which provides a seal with the housing 4.

Also disposed within the housing 4 is an annular solenoid coil 20, the coil having leads 21 and 22 which extend externally of the valve for connection to an external source for actuation of the valve. A further annular pole piece 18 which is formed of a magnetically permeable material, preferably stainless steel, is positioned adjacent the coil 20 and retains the plunger 5 therewithin. The plunger 5 is axially movable within the pole piece 18 and is formed of magnetically permeable material, preferably stainless steel. The plunger 5 has a groove which carries an O-ring 3 for providing a seal therewith and with the pole piece 18. A magnetic circuit is formed from the first pole piece 1, across the air gap 17 and through the plunger 5 to the second pole piece 18 and then to the housing 4 and back to the first pole piece 1. A compression spring 2 is secured against the pole piece 1 and rests in a hollow region of the plunger 5 to bias the plunger against a face seal 12. The face seal 12 is secured in the nose portion 7. A groove in the nose 7 carries an O-ring 11 which provides a seal between these elements and pole piece 18.

A snap ring 6 is secured between the housing 4 and the nose 7 to keep the plunger and nose from being pushed out by the spring. The snap ring 6 hold the assembly together. A seal retainer 8 having a hollow center portion is secured to the face seal and provides the outlet port 15 for the valve. The seal retainer 8 prevents the face seal 12 from being pushed into the outlet hole and retains the face seal. The inlet port 14 to the valve extends to the valve chamber 16 via inlet passages 13, the valve chamber being closed to the outlet 15 by the plunger 5 when the valve has not been actuated. O-rings 9 and 10 provide a seal between the solenoid valve and the portion of the air gun which applies air under high pressure to the valve inlet 14.

In operation, the air gun is pressurized to provide air at predetermined pressure at the valve inlet 14, the air filling the valve chamber 16 at the predetermined high pressure, typically 2000 psi. The air is prevented from discharging from the valve by the plunger 5 which is in the spring biased position as shown in FIG. 3, closing off all points of air egress to the outlet 15.

When current is applied to the terminals 21 and 22, the coil 20 is energized and induces an axially oriented magnetic field in the magnetic circuit which is provided as follows: the magnetic field passes through the first pole piece 1, across the air gap 17 and through the plunger 5 to the second pole piece 18, the return path for the magnetic field being from the pole piece 18 into the stainless steel housing 4 and passing around the coil and through the wall back into the first pole piece 1. The housing is formed of magnetically permeable stainless steel. Thus, the entire magnetic circuit is defined by non-corrosive permeable materials.

Upon energization, the plunger 5 is attracted by the first pole piece 1 and slides with the seal 3 to suddenly open the outlet port 15 by connecting it to the inlet port 14 through inlet passage 13 and valve chamber 16. This allows high pressure air to pass to the outlet port 15. The magnetic attraction between pole piece 1 and plunger 5 acts against the force of the spring 2 and, upon the removal of the magnetic field, the spring forces the plunger 5 to return into sealing engagement with the face seal 12.

Figure 1:
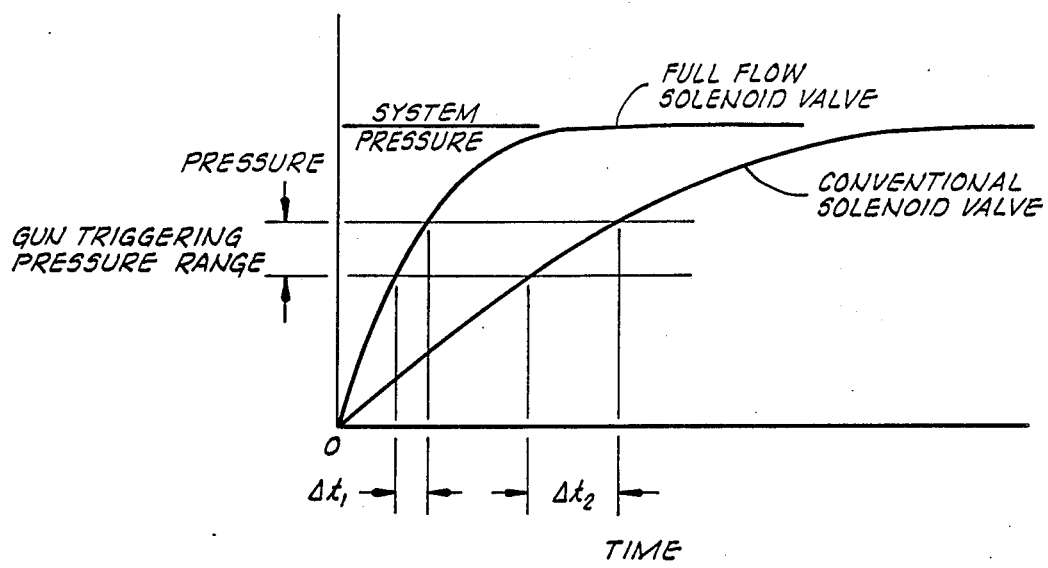
FIG. 1 is a graph of pressure versus time for a solenoid valve showing the triggering window for the full flow solenoid valve of the present invention compared with that of the conventional solenoid valve.

It can be seen that the plunger moves rapidly when the coil is energized and provides communication between the valve chamber 16 and the outlet 15 along a 360 degree port opening, this action taking place rapidly to provide the type of action depicted in the curves of FIGS. 1 and 2 for the full flow embodiment.

FIG. 2 is a plot of the flow areas for the conventional valve as opposed to the full flow solenoid valve in accordance with the present invention. With the conventional solenoid valve, as, for example, that depicted in the above noted Chelminski patent, the plunger 82 thereon slides past the holes 108 in valve stem 76, thus uncovering the holes and providing the flow area for the discharge air. As can be seen from FIG. 2, there is a dramatic increase in the flow area for the valve of the present invention as opposed to that of the prior art.

It should also be noted that both conventional and the full flow solenoid valves in accordance with the subject disclosure must be balanced with pressure in order to operate properly. This means that the solenoid plungers must be sealed in such a way that an additional load is not placed on the plunger due to the pressure. This result is achieved in the prior art as depicted in the above noted Chelminski valve by O-rings 160 and 84. Because both O-rings seal at the same diameter, there is no force due to the air pressure surrounding the plunger 76. The magnetic force need only pull against the force of the spring 86. The same is true for the solenoid valve of the present invention. The pressure is sealed from the plunger by O-ring 3 and face seal 12. The plunger sealing diameter is the same for the plunger face and O-ring 3. This balanced design is required in order to make the solenoid valve sufficiently small for attachment to the air gun. Also, the solenoid coil would have to be much larger in order to provide the additional plunger pull. This would also require a much larger electrical current, thus requiring larger electrical cabling which could make the valve impractical. Within the size restrictions of the solenoid valve (to fit the existing air guns), the subject solenoid valve achieves the higher air flow rate without increasing the overall valve size.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A valve assembly for controlling the actuation of a seismic energy source, comprising:

a valve housing;

first fluid port means for communicating fluid with said valve assembly, said first fluid port means including a nose portion defining an annular chamber within said housing;

second fluid port means for communicating fluid with said valve assembly, said second fluid port means including a seal retainer having a hollow center portion coaxial with said annular chamber within said housing, said seal retainer connected to said nose portion;

an annular face seal disposed between and adjacent to both said nose portion and said seal retainer;

a reciprocable annular plunger including a cylindrical outer surface terminating at a forward annular sharp edge, said plunger disposed in said housing for movement relative to said nose portion, said seal retainer and said face seal so that said edge engages and disengages said face seal to isolate and communicate said annular chamber and said hollow center portion along a 360° port opening; wherein in response to said edge engaging said face seal, said 360° port opening is closed with a portion of said cylindrical outer surface adjacent said annular chamber; and wherein in response to said edge disengaging said face seal, said 360° port opening opens so that flow rate of fluid through said 360° port opening begins immediately and increases linearly with plunger displacement by which said edge disengages said face seal; and plunger actuation means within said housing for selectively effecting said plunger displacement of said plunger.

2. The apparatus of claim 1, wherein said plunger actuation means comprises a spring for continuously biasing said plunger means in a first direction and controllable propelling means for moving said plunger means in a second direction opposite to said first direction in contravention to said spring.

3. The apparatus of claim 2, wherein said spring is coaxial with said plunger means and at least partially contained therein.

4. The apparatus of claim 2, wherein said plunger means is comprised of a magnetically permeable material and said propelling means comprises a solenoid coil disposed about said plunger means and adapted to selectively generate a magnetic field.

* * * * *